United States Patent [19]

Glenn, II et al.

[11] Patent Number: 4,459,623
[45] Date of Patent: Jul. 10, 1984

[54] METHOD AND APPARATUS FOR RECOVERING NRZ INFORMATION FROM MFM DATA

[75] Inventors: Fletcher M. Glenn, II, Danville; James A. Fosse, Hayward, both of Calif.

[73] Assignee: MDS Qantel Corporation, Hayward, Calif.

[21] Appl. No.: 340,312

[22] Filed: Jan. 18, 1982

[51] Int. Cl.³ .............................................. G11B 5/09
[52] U.S. Cl. ......................................... 360/43; 360/51
[58] Field of Search .................. 375/110, 118; 360/39, 360/43, 51

[56] References Cited

U.S. PATENT DOCUMENTS

| | | | |
|---|---|---|---|
| 3,646,520 | 2/1972 | Spencer | 340/172.5 |
| 3,778,793 | 12/1973 | Hayashi et al. | 340/172.1 |
| 3,887,942 | 6/1975 | Horowitz | 360/51 |
| 4,009,490 | 2/1977 | Fassbender | 360/45 |
| 4,063,291 | 12/1977 | Gennetten | 360/40 |
| 4,065,796 | 12/1977 | Dehart | 360/51 |
| 4,072,987 | 2/1978 | Walker | 360/48 |
| 4,127,878 | 11/1978 | Johnson, Jr. et al. | 360/51 |
| 4,173,027 | 10/1979 | Rathbun | 360/45 |
| 4,183,066 | 1/1980 | Anderson | 360/40 |
| 4,198,663 | 4/1980 | Sugihara | 360/40 |
| 4,222,080 | 9/1980 | Frazier | 360/40 |
| 4,234,897 | 11/1980 | Miller | 360/45 |

Primary Examiner—Vincent P. Canney
Attorney, Agent, or Firm—Limbach, Limbach & Sutton

[57] ABSTRACT

An all digital method and apparatus for recovering NRZ information from MFM data wherein the MFM pulse stream is monitored through hypothetical windows, the receipt of a pulse during a particular window providing information about the data state(s) represented by the pulse and tracking adjustments required to recover subsequent pulses, and further wherein each window is divided into a large number of subinterval's so that the coincidence of a pulse with a particular subinterval provides information about the amount and direction by which the position of subsequent windows should be changed for tracking correction; the windows and subintervals being implemented by the execution of one of a number of step sequences, the particular step sequence being executed indicating the classification of a pulse received during the particular step sequence, and the step being executed at the time of receipt of the pulse indicating required tracking adjustments.

15 Claims, 5 Drawing Figures

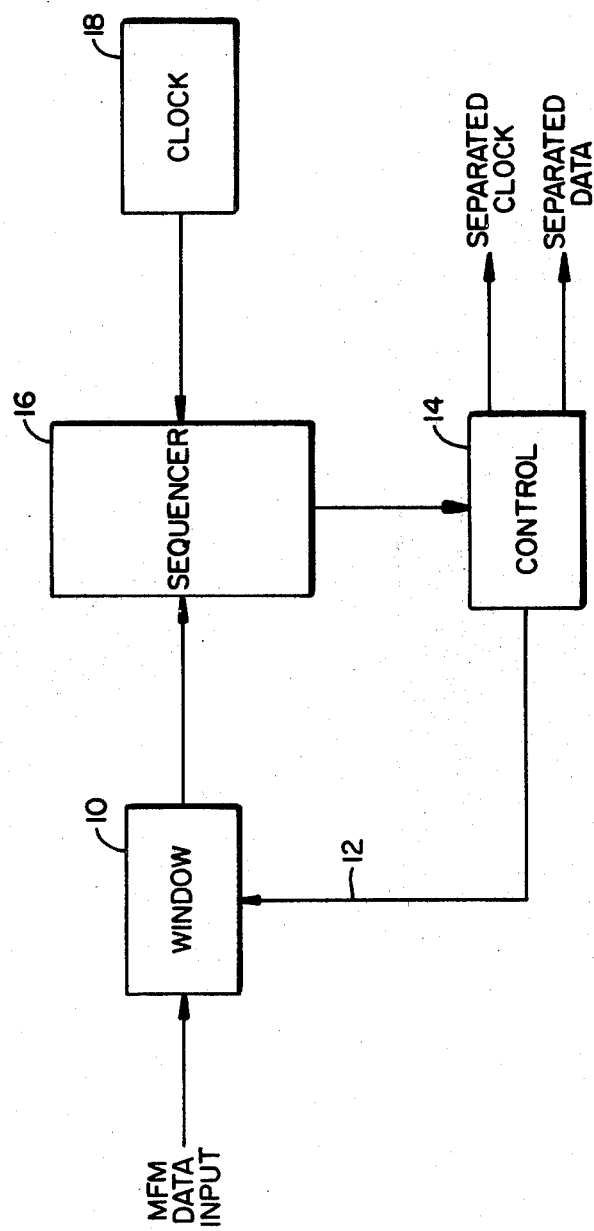
FIG._1.

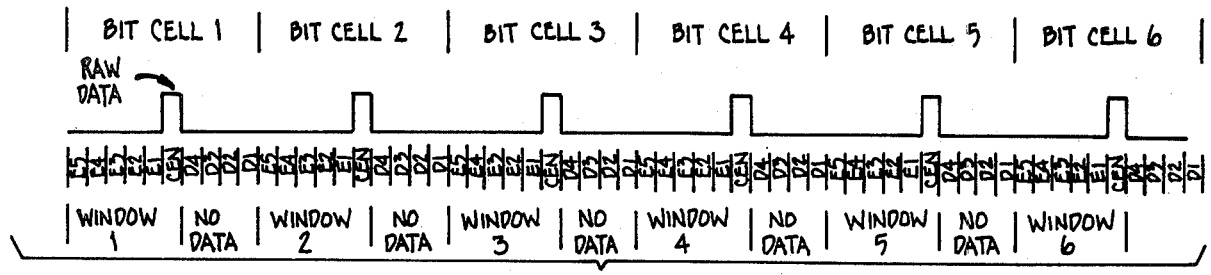
FIG._2A.
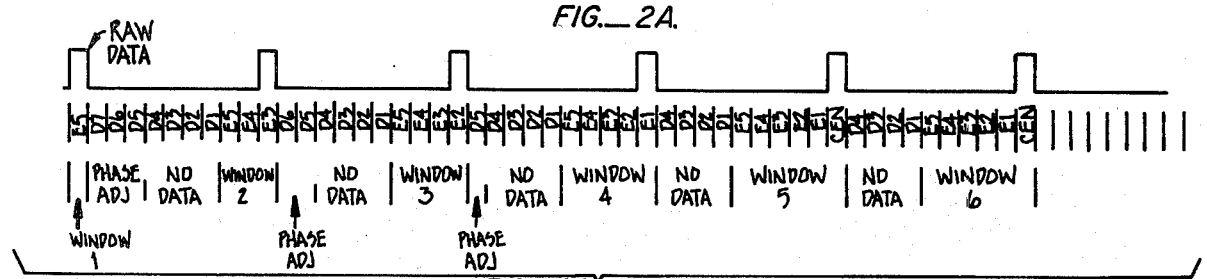
FIG._2B.
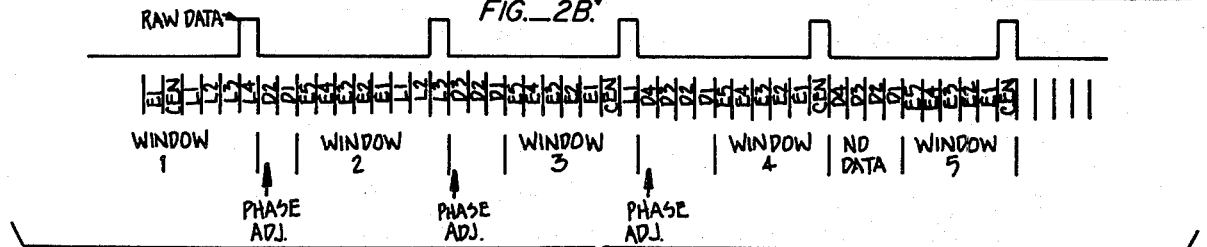
FIG._2C.
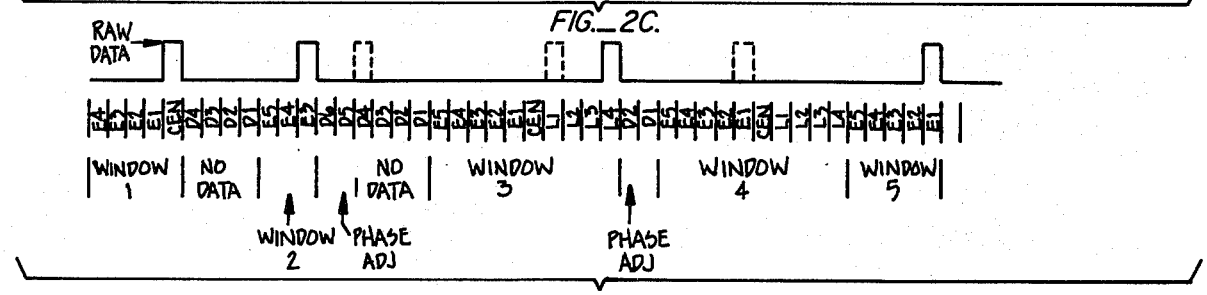
FIG._2D.
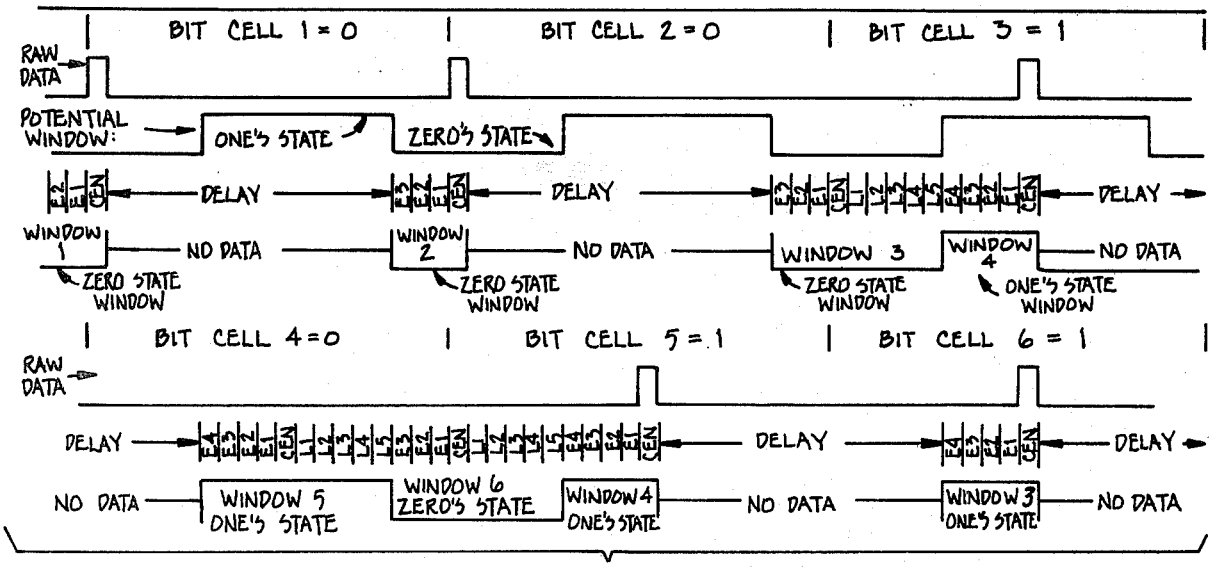
FIG._2E.

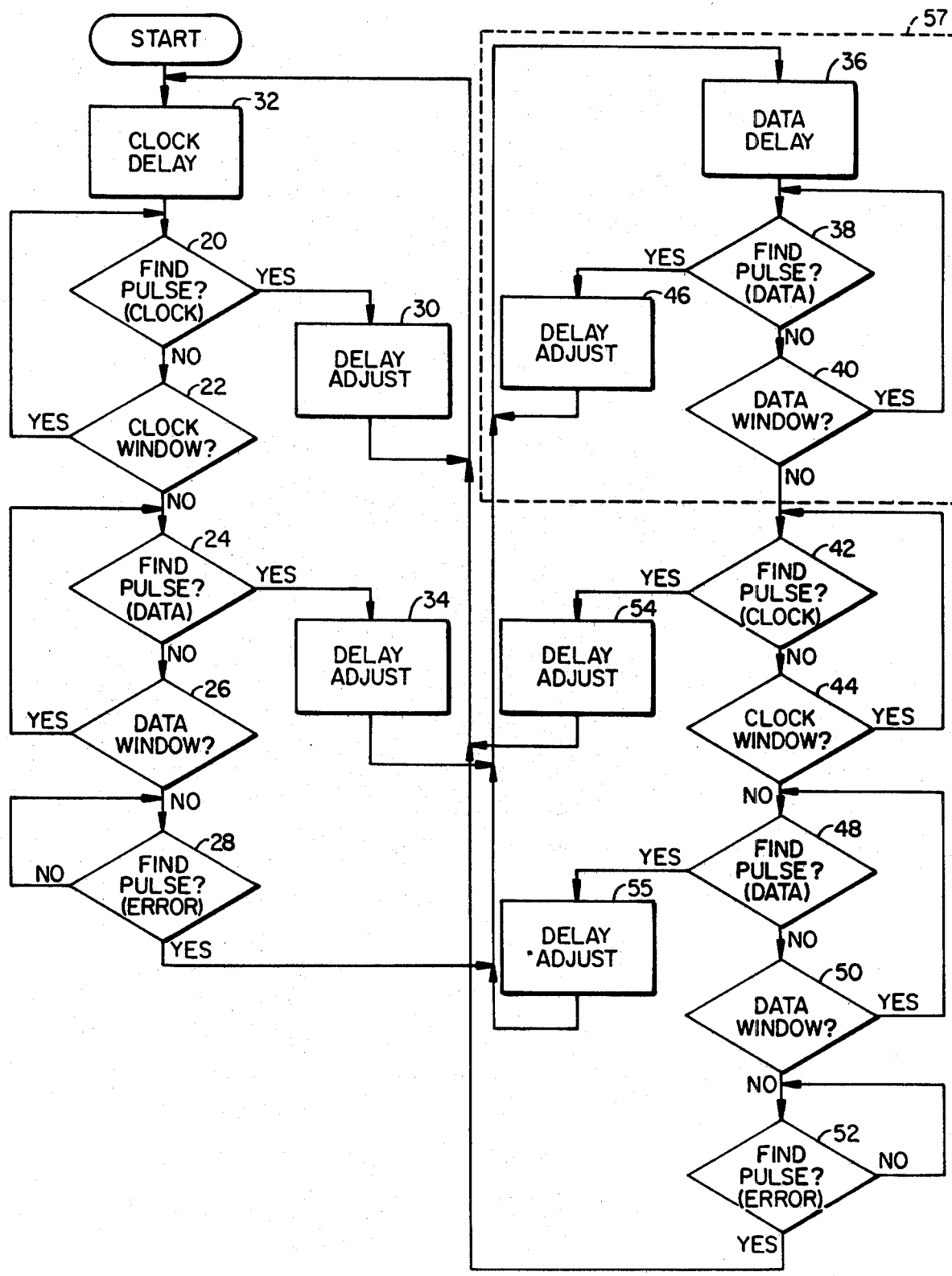
FIG._3.

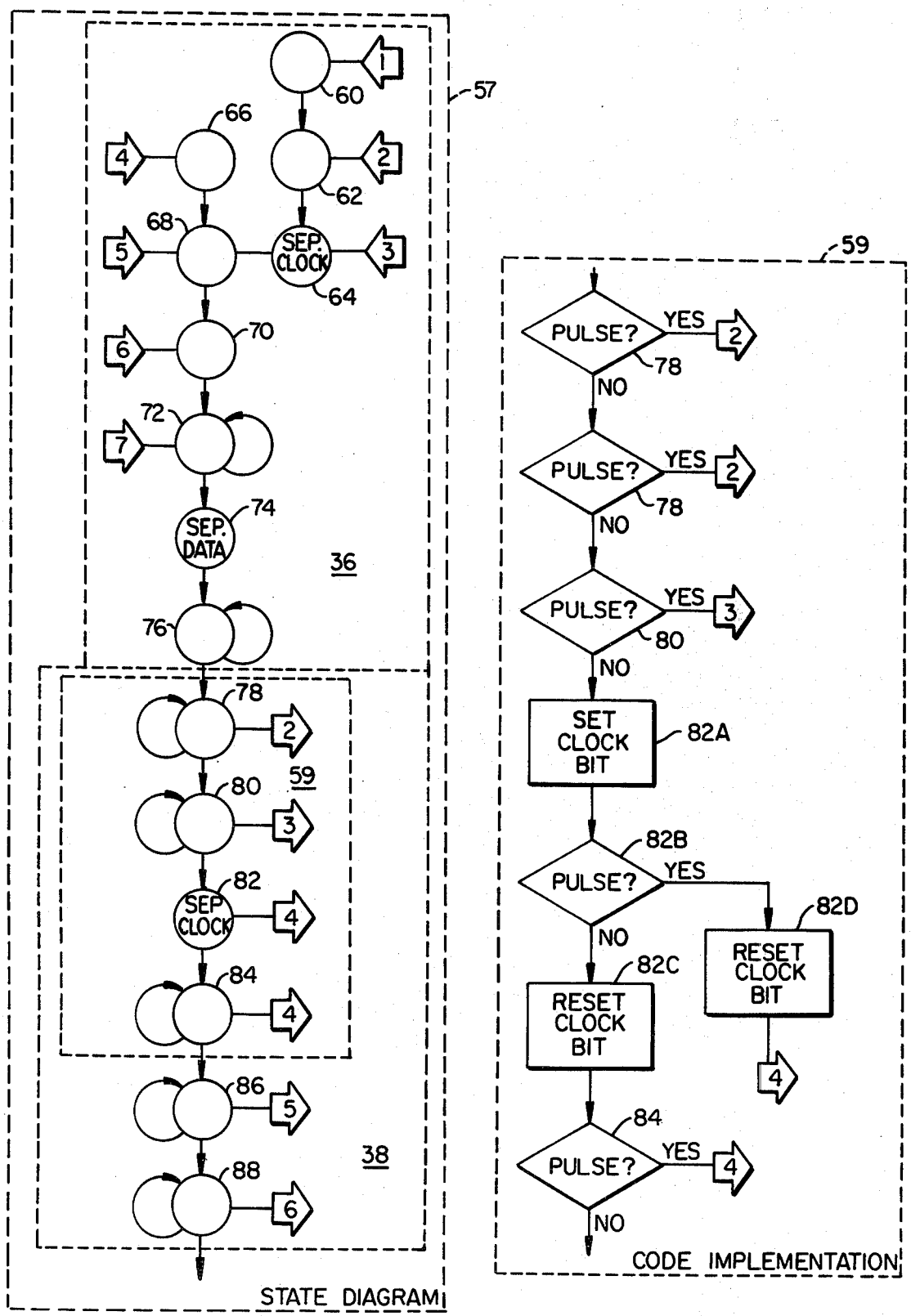
FIG._4.

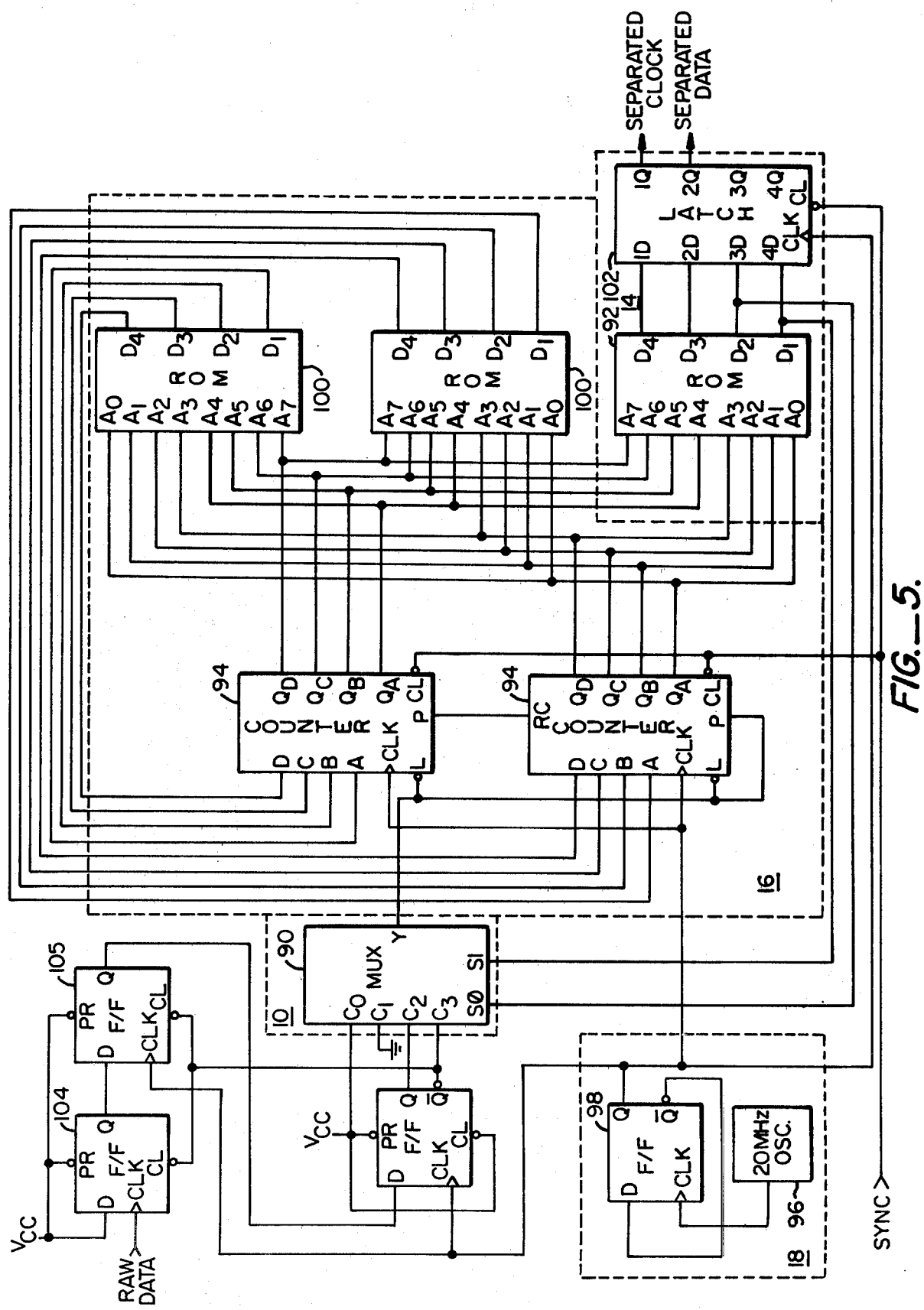
FIG._5.

METHOD AND APPARATUS FOR RECOVERING NRZ INFORMATION FROM MFM DATA

BACKGROUND OF THE INVENTION

The invention is directed to the recovery of data stored in magnetic storage media and, in particular, to an all digital method and apparatus for recovering non-return-to-zero (NRZ) information from modified frequency modulated (MFM) data from magnetic storage media.

In magnetic storage media, data are recorded in the form of magnetic flux transitions. Because flux transitions, rather than flux states, represent data states, and because in strings of the same data state no data transistions are present, various encoding techniques are used to assign flux transition sequences for encoding digital data. Among the advantages of using such encoding techniques include a self-clocking capability as well as greater data packing densities. One such encoding scheme is MFM encoding.

MFM encoding involves the use of the position of a pulse or transition within a bit cell to designate the meaning of the datum represented within each cell. There are a number of variations on the encoding scheme used to implement MFM coding. Among those is a scheme in which a one's bit is represented by a flux transition or pulse in the middle of a bit cell. A zero's bit is represented by a flux transition or pulse at the beginning of a bit cell or no flux transition throughout the bit cell, the latter occurring whenever the particular bit cell is preceeded by a bit cell having a one's bit represented therein. For example, a 10100 bit stream would be represented by a first cell having a flux transition at its midpoint, a second cell having no flux transitions throughout, a third cell having a flux transition at its midpoint, a fourth cell having no flux transitions throughout, and a fifth cell having a flux transition at its starting point. By encoding digital data in this manner the maximum gap between flux transitions is approximately two bit cells, while the spacing for long strings of bits having the same value will be equal to one bit cell. Packing densities are thereby increased.

In the typical magnetic storage media data recovery system several practical problems arise including, variations in the positions of the flux transitions due to variations in the media drive mechanism, and apparent flux transition position shifts when packing densities are very high. In the latter phenomenon, the flux magnitude of adjacent flux transitions tend to modify the flux magnitude of the transition of interest, so that the peak of each transition is effectively shifted in position away from its expected position within the bit cell.

Historically, analog phase locked loop techniques have been used to correct for the above drive variations and bit shifts. The phase locked loop systems included a phase detector, a filter, and a VCO, the VCO being implemented so that its period defined the window edges by which the data from the magnetic media were examined. The VCO frequency was typically two to four times the data rate. Analog phase locked loop systems were not without deficiencies, however. For example, because a phased lock loop has a natural frequency (rest frequency or center frequency) when out-of-lock an initial phase difference between the center frequency of the phase locked loop and the bit cell must be overcome before tracking of the signal can begin.

Additionally, the typical analog phase locked loop has a finite bandwidth. The magnitude of this bandwidth is chosen with several criteria in mind, including the ability to stably track data variations, and the ability to lock to the incoming data frequency quickly. In order to obtain the former, a narrow bandwidth is required. However, this narrow bandwidth limits the speed with which the loop can obtain lock. On the other hand, a wide bandwidth permits the phase locked loop to obtain phase lock quickly. A wide filter bandwidth, however, causes the phase locked loop to be susceptible to noise in the incoming data stream.

One attempt to correct for such problems involves the use of two filters having different bandwidths, one for acquisition purposes having a wide bandwidth, and another for tracking purposes having a narrow bandwidth. However, the use of such dual mode phase locked loops leads to complex circuit and alignment requirements as well as other problems.

Several digital apparatus for recovering MFM encoded data exist. Frazier, U.S. Pat. No. 4,222,080 is perhaps the most pertinent. In Frazier, the periods between pulses are classified as long, middle, and short. Ratios of the number of short pulses, middle pulses, and long pulses with respect to one another are formed in order to determine whether a particular pulse represents a one or a zero data bit. As implemented, it appears that the circuitry in Frazier required to handle high bit rates and packing densities would be impracticable to build.

SUMMARY OF THE INVENTION

The foregoing and other problems of prior art data separators are overcome by the present all-digital data separator, comprising clock means for generating a clock signal wherein the clock signal has a frequency which is significantly higher than the frequency of the incoming pulse stream. Window means are provided which are responsive to the pulse stream and to a control signal. The window means supply a window signal which is selected from a number of signals, including the pulse stream, as a function of the control signal. Sequencing means are provided which are responsive to the window means output signal and to the clock signal. The window means execute a step sequence which is designated from among a number of predetermined step sequences. Each step sequence has a number of steps which are executed at the clock signal frequency. The particular sequence which is to be executed by the sequencing means is designated by the particular step being executed by the sequencing means at the moment of receipt of a designated signal from the window means. Control means are also provided which are responsive to the steps being executed by the sequencing means. The control means interpret the step being executed and supply the control signal to the window means. Additionally, the control means, as a function of the executed step, provide separated clock signals and separated data signals as the output of the data separator.

The method of the present invention includes the steps of monitoring the incoming pulse stream through a sequence of windows, classifying the pulse according to the window during which it was received, and adjusting the window sequence according to the position of the pulse within the window in which it was received.

The window sequence includes one's data windows and zero's data windows. The classification of a data window is defined by the rules of the particular encoding scheme used to generate the incoming pulse stream. Delay intervals are inserted between the windows to reflect those parts of the pulse stream during which no pulses are expected to be received. The window's themselves are divided into subintervals so that the position of the pulse within the window can be determined. Whenever a pulse is received early or late within a window, the delay interval associated with subsequent windows is lengthened or shortened to maximize the probability that subsequent pulses will be received within the appropriate window.

The present invention offers several advantages over previous data separator configurations. First of all, because the system is implemented in all digital form, no factory alignment is required as with analog systems. In previous analog phase locked loop systems, filter bandwidth and VCO frequency adjustments were often required. Another advantage is that because only a few parts are used, the present invention is inexpensive to construct. A further advantage is that the invention is easy to troubleshoot. Furthermore, only standard parts are required.

Unlike frazier, the present invention does not use ratios of the number of different pulse lengths present within the incoming MFM data stream. Instead, the present invention utilizes windows in time and the presence or absence of pulses within those windows to determine the meaning of the data contained therein. As a result, the circuitry required to implement the present invention is significantly reduced, both in amount and in complexity.

It is, therefore, an object of the present invention to provide an all-digital method and apparatus for separating NRZ information from MFM data from magnetic storage media.

It is a further object of the present invention to provide a method and apparatus for separating data from an MFM data stream, wherein the receipt of a pulse within a predetermined time window is analyzed to provide adjustments to the time window for accurate tracking of the data stream.

It is a still further object of the present invention to provide a method and apparatus for data separation of MFM data from magnetic storage media in which sequencing means receives information from time window means, the information causing a specified step sequence to be executed, and wherein control means, responsive to the step sequence being executed, provide tracking adjustment signals to the window means and output separated data and clock signals.

The foregoing and other objectives, features and advantages of the present invention will be more readily understood more consideration of the following detailed description of certain preferred embodiments of the invention, taken in conjunction with the accompanying drawings.

BRIEF DESCRIPTION OF THE DRAWINGS

FIG. 1 is a simplified block diagram of the present invention.

FIG. 2 is a timing diagram illustrating the tracking capabilities of the present invention.

FIG. 3 is a flow diagram illustrating the data separation process.

FIG. 4 is a state diagram of a part of the data separation process.

FIG. 5 is a detailed schematic of the present invention.

DETAILED DESCRIPTION OF THE INVENTION

FIG. 1 is a simplified block diagram of the present invention. The MFM data from a magnetic storage media (not shown) is received by window circuitry 10. Window circuitry 10 also receives control signals on line 12 from control circuit 14. The output of window circuit 10 is supplied to the sequencer circuit 16. Sequencer circuit 16 is also supplied with a clock signal from a clock circuit 18. The output of sequencer circuit 16 is supplied to control circuit 14. In addition to the control circuit signal on line 12, control circuit also provides a separated clock signal and a separated data signal, both in response to the signal received from the sequencer circuit 16.

Window circuit 10 will now be described in greater detail. The purpose of window circuit 10 is multifold. First, the circuit serves to provide a time window for examining the incoming MFM data stream. Depending upon the state of the control signal on line 12, a pulse present within the MFM data stream and during the time window will cause a specified signal to be passed to the sequencer circuit 16. For example, the control signal on line 12 can cause the window circuit 10 to output a pulse whenever a pulse is present in the MFM data stream during the time window. Conversely, the window circuit can be instructed to output a pulse if no pulse is present in the MFM data stream during the time window. Alternatively, the window circuit can be instructed to output a pulse no matter what the state of the MFM data stream. The window circuit, therefore, provides an output signal which is function of the state of the MFM data stream and the control signal on line 12. In turn, the control signal on line 12 is a function of the step being currently executed by the sequencer 16.

The sequencer circuit 16 will now be described in greater detail. The sequencer circuit 16 executes a designated sequence of steps at a frequency determined by the clock signal from the clock circuit 18. The particular sequence of steps being executed is determined as a function of the step being executed by the sequencer circuit 16 when a pulse is received from window circuit 10. Until such pulse is received, the sequencer circuit 16 continuously steps through its current sequence. These steps, as they are executed by the sequencer circuit 16, are supplied to control circuit 14.

Upon receipt of a pulse from window circuit 10, the step currently being executed by sequencer circuit 16 supplies the identity of the sequence which the sequencer is to next execute. The sequencer circuit 16 then steps through this next sequence until another pulse is received from the window circuit 10.

Control circuit 14 will now be described in greater detail. Control circuit 14 interprets the step sequence through which sequencer circuit 16 is proceeding. Pursuant to this interpretation, the control circuit supplies control signals on line 12 to the window circuit 10 to adjust the time window for receiving pulses from the MFM data stream, as well as to cause the window circuit 10 to provide pulses to the sequencer circuit 16 should execution of a different sequence be necessary. Control circuit 14 also interprets the sequencer circuit output to provide a separated clock signal and a separated data signal to the user. The content of the separated data output is a function of the sequence being executed by the sequencer circuit 16. The separated clock output is provided at a predetermined frequency which is a function of the clock circuit 18 frequency, i.e., the frequency at which the sequencer executes the step sequence, and of the point in time at which receipt of data in the data stream commences.

The clock frequency from clock circuit 18 is selected to be significantly higher than the data rate present in the MFM data stream. As such, the rate at which the sequencer circuit executes a particular step sequence is significantly higher than the rate at which pulses from the MFM data stream are delivered through the window circuit 10 to the sequencer circuit 16. The result is to divide the time window of the window circuit 10 into a large number of subintervals. The point within the time window at which a pulse is received can therefore be established depending upon the particular subinterval during which the presence of the pulse is first detected.

The present invention separates the data from the MFM data stream in the following manner. The following discussion assumes that the MFM data are presented to the data separator uninfluenced by any tracking effects or any bit shift phenomenon. Given a known value for the first pulse received in a pulse train, the system monitors a time interval between each pulse received and determines the state of the data represented by the presently received pulse, in light of the data state represented by the previously received pulse.

Recall that in the particular MFM encoding format discussed above, a pulse is placed in the middle of a bit cell whenever a one's data state is sought to be represented. Additionally, a zero's data state is represented by a pulse at the beginning of a bit cell, when the zero's data state follows a previous zero's data state. Alternatively, if the zero's data state follows a previous one's data state, no pulse is inserted within the bit cell.

Given this encoding format, the system can identify the data state represented by a received pulse depending upon the time elapsed since the previously received pulse and by the data state represented by the previously received pulse. For example, if a pulse is received one-and-a-half bit cells after a previous pulse, the system will treat the present pulse as representing a data state opposite that of the data state represented by the previous pulse. In addition the system recognizes that a zero state is present between the data state represented by the previous pulse and the data state represented by the current pulse. If a one-bit cell interval has elapsed, then the data state represented by the current pulse is the same as the data state represented by the previous pulse. If a two-bit cell interval has elapsed, then, by definition, the current pulse represents a one's data state with a zero intervening and the previous data state must necessarily represent a one's data state. If such is not the case, the system knows that an error has occurred in the tracking of the data.

Referring to FIG. 3, this process is illustrated in flow diagram form. FIG. 3 is a flow diagram of the process steps executed by the system in decoding MFM data. The figure includes steps associated with initial synchronization for the system to the data, as well as steps associated with the tracking of the data when effects such as tracking and bit shifts are present. For the purpose of the present explanation, blocks associated with the decoding process will be discussed in detail, while blocks associated with the tracking process will be discussed in passing, with the intent that the tracking of the MFM data will be explained in detail infra.

Assume for the present discussion that the previous pulse received indicated the presence of a zero data state, in step 20. The system thereafter first looks for a pulse associated with a zero state. This is because the shortest time interval which can be present within an MFM data stream will have the same data state as the previously received pulse.

At this point a distinction should be made between the time interval at which a pulse is received and the time window within which a pulse having a particular data state is searched for. The time interval for receipt of the pulse corresponds to the time which has elapsed since the receipt of a previous pulse. By definition, a perfectly encoded data stream contains pulses which are positioned at intervals corresponding to a one bit cell time interval, a one and one-half bit cell time interval or a two bit cell time interval. In practice, however, pulses will actually be positioned in the vicinity of their theoretical positions. To allow for this, time windows are specified which include the theoretical pulse position and predetermined intervals preceding and following the theoretical pulse position. The windows referred to in this discussion correspond to these time windows.

The system enters step 20 at a predetermined time prior to the theoretical pulse position in the bit cell. This corresponds to the start of the time window described above. In step 22, the system keeps track of the time window and continues to loop through steps 20 and 22 until either the time window has elapsed or a pulse is received. If no pulse was received within that time window, the system proceeds to step 24 in which it searches for a pulse which it will associate with a one's data state. The time window for this search, step 26, is positioned about a point one and one half bit cells from the previously received pulse.

The system will loop through steps 24 and 26 until either a pulse is received, or the one's data window interval has elapsed. By definition, a pulse which follows a zero's state pulse must occur one bit cell later, if a zero's state pulse, or, one and one-half bit cells later, if a one's state pulse. A pulse received at two bit cells from the previous zero's state pulse position indicates an error. Therefore, if no pulse is received after a zero data window and a one data window have elapsed (i.e., two bit cells from the previous zero data pulse), the system will treat such an occurence as an error and take appropriate action. This is represented by block 28.

If in step 20 a pulse is received within the zero's state window, the system will make appropriate adjustments in steps 30 and 32 and then re-enter step 20 to search for the next zero state pulse. Likewise, if the system receives a one's state pulse in step 24 the system will make adjustments for tracking or bit shift error in steps 34 and 36, then proceed with searching for another pulse representing a one's data state, step 38.

Note that the system proceeds to a different set of blocks after detecting a one's data state which follows a zero's state. This permits the system to detect a 101 data stream. Recall that a two bit cell interval is permitted between one's data pulses where a zero's data state separates them. In such a case, the first bit cell would contain a pulse at its mid-point, the second cell would not contain a pulse, and the third bit cell would contain a pulse at its mid-point. The first of these one's data pulses would be detected in step 24. In steps 38 and 40, the system searches for another one's state pulse, which would occur in the shortest interval from the previous pulse, i.e., within the second bit cell. The next shortest interval would correspond to a zero's state pulse, at the beginning of the third bit cell, searched for in steps 42 and 44. If no pulse was received in either of steps 38 and 40 or steps 42 and 44, the remaining definitional alternative is that a one's state pulse will occur at the mid-point of the third bit cell, two bit cell intervals after the preceding pulse. This second one's state pulse is searched for in steps 48 and 50. If a pulse is received therein, the system will know that a zero's state was embedded between the first and second one's state pulses. If no pulse was received in steps 48 and 50, an error would be indicated.

If a pulse is received during the execution of steps 38 and 40, the system will make appropriate delay adjustments in steps 46 and 36 and return to block 38 to search for additional data pulses.

If no pulses are received during the indicated time interval in step 50, the system reverts to a "trap state", step 52, in which the system takes appropriate steps to correct for the error indicated. If during the execution of steps 42 and 44 a pulse is received, the system will make the appropriate tracking adjustments in steps 54 and 32 and then return to steps 20 and 22 to search for a pulse representing a zero's data state. At this point, the system has come a full circle.

Briefly, the order in which the particular data state pulses are searched for, and the time intervals permitted for such searches, is indicative of the format in which the MFM data are encoded. Therefore if a different variation of encoding has been utilized, a different but similar sequence of steps can be implemented to decode such information.

In summary, the flow diagram of FIG. 3 illustrates a process by which the system first receives a pulse and assigns a data state value to the pulse. The system, thereafter, looks for a pulse to which it will assign the same data state value if received within one bit cell after the previous pulse. If the pulse is received more than one bit cell but less than two bit cells after the receipt of the previous pulse, the system treats the pulse as having the opposite data state as that of the previous pulse. A pulse received at two bit cells of a previous pulse is permissible, when that previous pulse had a data state which corresponded to a one.

The preceding discussion concerns itself with the decoding of MFM data from a data stream in which the usual tracking errors and bit shift phenomenon were not present. The following discussion concerns the manner in which the system compensates for any phase shift due to mechanical or other system effects, as well as for a bit shift due to high data packing density.

Referring to FIG. 2, one embodiment of the tracking feature of the present invention is illustrated. Typically, tracking errors manifest themselves in two forms: (1) A time (or phase) shift, common to all pulses in the data stream, in the same direction and of similar magnitude; (2) a time shift (or phase) of the pulse in the data stream with adjacent pulses shifting in opposite direction. The former tracking error is most often due to rotational variations due to variations in the drive mechanism. The latter error is due to the effects of the flux transition magnitudes of a particular pulse upon adjacent pulses. When data packing densities are high, the flux densities of adjacent pulses tend to act upon each other, causing the apparent peak of such flux densities to shift outward from each other thereby causing an apparent time shift of the pulse centers which are presented to the data separator.

In the embodiment of the present invention illustrated in FIG. 2, the system divides a bit cell into a number of subcells or subintervals. Each subcell is assigned a particular designation depending upon its position with respect to the previously received pulse and to the point in time at which a pulse is expected to be received. Referring to FIG. 2A, it can be seen that the subintervals within a bit cell have three designations: (1) An E designation for early, (2) a CEN designation for center, and (3) a D designation for delay. A fourth designation is illustrated in FIG. 2C: An L designation for late.

The center designation represents the subinterval in which the system expects a pulse to occur, if a pulse is to occur within the particular bit cell. If a pulse is received concurrent with a subinterval having an E or a D designation, the system is informed that a tracking error is present, and is also informed as to the magnitude of such tracking error. For example, if a pulse were received concurrent with the E3 subinterval, the system would know that the pulse was early by 3 subintervals. Likewise, if a pulse were received concurrent with an L1 subinterval, for example, the system would know that the pulse was late by 1 subinterval. The time windows 22, 26, 40, 44 and 50 are comprised of E, CEN, and L subintervals.

The D or delay designations are provided to indicate subintervals in which no data are expected to be received. This is possible because, by definition, once a pulse is received, a subsequent pulse will occur, at the earliest, approximately one bit cell later. The delay subintervals represent the period between the closing of one time window and the opening of the next time window.

Receipt of a pulse within a shorter time is possible due to tracking of bit shift defects; therefore, the number of delay subintervals is chosen to be somewhat less than one bit cell of time. As will be explained in detail later, the number of subintervals designated as delay intervals can be selected to approach a bit cell of total time depending upon the amount of phase adjustment necessary.

FIG. 2A illustrates the designation of the subintervals when the incoming pulse stream contains no tracking errors. Additionally, the pulses in FIG. 2A are deemed to represent the same data state. Therefore, the interval between each pulse corresponds to one bit cell. The waveform in FIG. 2A referred to as raw data corresponds to the pulse stream entering the data separator. Immediately below the waveform is illustrated the subinterval designation. Below the subinterval designations are illustrated the time windows produced by the window circuitry 10.

Referring more particularly to window 2, it can be seen that window 2 includes six subintervals, the first five of which are early intervals and the sixth of which is a center interval. Note that window 2 is preceded by four subintervals which have been designated as delay or D intervals. Under conditions where no tracking errors are present, the system provides for four delay subintervals immediately following the receipt of a pulse, and five early intervals thereafter. It should be noted that in this particular embodiment of the present invention, the bit cell is divided into ten subintervals, four delay subintervals, five early subintervals, and a single center subinterval.

FIG. 2B illustrates the phase adjustment performed by the system when pulses are received early in time. Note that during window 1, a pulse was received concurrent with the E5 subinterval. This indicated to the system that the pulse arrived five subintervals earlier than expected. In response to this occurrence, the system inserts three additional delay intervals D7 through D5. The number of delay subintervals inserted at this point is selected to maximize the probability that subsequent pulses will be received within a window, rather than to center subsequent windows with respect to subsequent pulses. Returning to FIG. 2B, it can be seen that the insertion of the additional states has caused the starting point of window No. 2 to delayed by a corresponding amount. The result is that the window No. 2 pulse is received concurrent with the early 3 subinterval. The insertion of the additional delay subinterval is based upon the assumption that the minimum separation between pulses in the incoming data stream will correspond to approximately one bit cell. As can be seen in FIG. 2B, the system continues to insert an appropriate number of delay subintervals until the received pulse is received concurrent with the CEN subinterval, as in window No. 5.

FIG. 2C illustrates the system adjustment when a pulse is received several subintervals after the expected subinterval of receipt. To adjust for such occurrence, the system deletes an appropriate number of delay states. As can be seen from the figure, the system continues to delete an appropriate number of delay states until the pulse is received concurrent with the CEN subinterval, as in window 4.

FIG. 2D illustrates the presence of tracking errors due to bit shift. Under these circumstances, one pulse arrives early, as in window 2, and the subsequent pulse arrives late, as in window 3. Upon receipt of the early arriving pulse, the system inserts the appropriate number of delay states as was done in FIG. 2B. With respect to the delayed pulse, the system deletes the appropriate number of delayed states as occurred in FIG. 2C.

The result of the above is that for every pulse received, and adjustment is made of the window through which the system looks for pulses and by which the system assigns a data state value to the particular pulse received.

Several observations are appropriate at this point. First of all, it should be noted that the particular window associated with a particular bit cell is opened upon the occurrence of an E5 subinterval, and is closed upon the receipt of a pulse. While under normal operating conditions, a window is typically six subintervals wide, a window can be as narrow as one subinterval and as large as ten subintervals. A further observation is that if, after a predetermined number of late subintervals, a pulse has still not been received, the system will treat any subsequently received pulses as corresponding to the next bit cell, and the next window. This is illustrated in FIG. 2D and, specifically, with respect to windows 4 and 5. Note that after late subinterval L4, the system designates the subsequent subinterval as an E5. Note that window 4 closed upon the end of subinterval L4 and that window 5 opened at the beginning of subinterval E5. Any pulse received during the opened state of window 5 will be treated as having a different data state than that for the previously received pulse.

Referring to FIGS. 2E and 3, the flow diagram in FIG. 3 will be correlated with the waveforms, bit cells and subintervals of FIG. 2E. Upon to this point, the window adjustments have been expressed in terms of the windows for a series of pulses having the same data state. In FIG. 2E, a series of pulses representing different data states is illustrated, more specifically a 00101100 data string. As can be seen in FIG. 2E, there are two types of windows which are associated with monitoring the incoming pulses. The first is a zero data state window and the second is a one data state window. Because there are potentially two portions of a bit cell which can be examined, the incoming data stream is monitored by alternating one's data state window and zero's data state windows. This alternating arrangement is illustrated by the waveform labelled "potential". The waveform is disposed beneath the depiction of the bit cells and corresponding pulses within the bit cell. It will be noted that a pulse received when the waveform is at its high level will be interpreted as having a one's data state and a pulse received when the waveform is at its lower level will be interpreted as having a zero's data state. The zero's data state window is positioned about the beginning of each bit cell and the one's data state window is positioned about the midpoint of each bit cell.

Illustrated below the alternating window waveform are subinterval assignments for each bit cell. Disposed below the subinterval assignments is a waveform representing the actual state of the data separator window at a particular point in time, the possible states being a zero's data state window, a one data state window or a delay mode.

In FIG. 2E, the pulse received within window No. 1 is associated with a zero data state. This corresponds to blocks 20 and 22 in FIG. 3. Since the pulse was received concurrent with the CEN subinterval, no delay adjustment is necessary in block 30 of FIG. 3. The delay itself is implemented in block 32 of FIG. 3. Window 2 is implemented by block 20 so that any pulse received in the window is again associated with a zero data state. Again, the delay following window No. 2 is implemented through block 32 and window No. 3 is examined by block 20.

In FIG. 2E, no pulse was received during the duration of window 3. In block 22 the system terminates window 3 and proceeds to block 24 in which window 4 is opened, a one's data window. As can be seen in FIG. 2E, a pulse is received concurrent with the CEN subinterval of window No. 4 and the appropriate delay is inserted through blocks 34 and 36 in FIG. 3.

At this point, the difference between the potential window waveform and the actual window waveform should be noted. With respect to the delay following window No. 1, it is seen that a one's data window was not opened during that period since a pulse had already been received in the particular bit cell. Therefore, the system by-passed the one's data state window for that bit cell and opened a zero data state window, window 2, for the next bit cell. Due to the receipt of a pulse in window 2 only a portion of the potential window waveform for the particular bit cell is actually implemented. In contrast windows 5 and 6 illustrate the opening of a one's window and a zero's window to the full extent.

As described above, in window 4, the system is executing blocks 24 and 26 of the flow diagram in FIG. 3. When a pulse is received during the execution of these blocks, the system proceeds to blocks 38 and 40 instead of looping back to 24 and 26. The reason for this is to permit the system to insert window delays without interfering with the switching of system modes between a zero data window and a one data window, represented by blocks 22 and 24. Additionally, this permits the system to detect the suppression of the zero state pulse when such state follows a one's state pulse, as well as detection of a 101 bit string.

The entry of the system into the mode represented by blocks 38 and 40 of FIG. 3 corresponds to window 5 in FIG. 2E. As can be seen from FIG. 2E, no pulse is received during window 5; therefore, the system proceeds to blocks 42 and 44 in FIG. 3 and opens window 6 in FIG. 2E. At this point, the system will treat any pulse received therein as representing a zero data state. Because no pulse is actually received in window No. 6, the system proceeds to blocks 48 and 50 in which it searches for a pulse to which it will assign a one's data state. Such a pulse is received.

It will be noted that between the receipt of the pulse in window No. 4 and the receipt of the pulse in window No. 7, a time interval corresponding to two-bit cells has elapsed. As discussed above, this condition is permissible when the pulses received represent one's data states, and the condition is not permissible when the pulses received represent zero data states.

An additional observation is that whenever a pulse is received during the processing of blocks 42 and 44 or blocks 48 and 50, by definition, the system knows that a zero data state has occurred between the two pulses. This is illustrated by examining the progression in FIG. 2E from window 4 through window 7, and again from window 8 through window 10. In both situations, a zero data state is preceded by a one's data state. The pulse which would normally be inserted at the beginning of the bit cell to which the zero data state has been assigned is suppressed in accordance with the MFM encoding scheme. The absence of a pulse within a particular data cell is noted whenever the system proceeds from block 40 to block 42; i.e., from window 5 to window 6 or from window 9 to window 10 in FIG. 2E.

The above description has been provided for purposes of illustration only. Therefore, the provision for a certain number of delay states, late states, early states and the like are not intended as limitations to the scope of the present invention. As will be apparent to those skilled in the art, the choice of the numbers of the various subinterval assignments is subject to wide variation depending upon the conditions present in the particular system. In the present invention, the various delay states, early states and late states are selected to optimize the probability that a pulse will be received within a window which matches its assigned data state.

Additionally, the total number of subintervals, which is preferably very large, is not intended to be limited by the description provided above. Again, the number of subintervals per bit cell which is most appropriate for a particular system is a function of the various operating parameters of that system, and should be selected accordingly. In the preferred embodiment of the present invention, a bit cell is divided into at least ten subintervals.

As described above, the system issues a separated data clock independently of the timing of the pulses received at the data input. The system also issues a separated data pulse which is synchronized to the separated clock pulse. Typically, a data pulse will issue approximately several microseconds after the system has actually determined that a one's data pulse has been received in the data stream. The absence of a data pulse represents the receipt of a zero data state. The system, in issuing the separated clock and separated data pulses, maintains the sequential order of the received one's and zero's data states.

In FIG. 4, a portion of the state diagram of the system is given wherein the issuance of separated clock pulses and separated data pulses is illustrated. The state diagram corresponds to the portion of the flow diagram in FIG. 3 which is enclosed by dashed lines 57. Also provided is a block diagram representation of a certain portion of the state diagram enclosed in dotted lines 59. The states 60 through 76 occurring in the upper portion of the state diagram correspond to delay block 36 in FIG. 3. States 78 through 88 correspond to block 38. Block 40 is implemented when the system executes step 88 without branching to arrow 4.

The delay in block 36 is implemented by stepping through a designated number of states represented by steps 60 through 76. The delay adjustments by blocks 34, 46 and 54 are implemented by entering the delay states at different points within the sequence. As can be seen in FIG. 4, entry into the sequence at arrow 4 will add an additional delay state to the sequence, whereas entry into the sequence at arrow 6 will delete a delay state from the delay sequence. It will be noted that within the delay sequence, a separated clock is issued, depending upon whether the delay sequence is entered at arrows 1, 2 or 3 or arrows 4-7.

Recall that the system enters the state sequence in FIG. 4 whenever a one's data pulse has just previously been detected. Therefore, it will be noted that several states down the sequence a separated data step 74 has been included to issue a separated data signal. The number of steps separating the point at which the delay portion of the state sequence is entered, and the step within the sequence at which a separated data pulse is issued represents the delay between the detection of a one's data state and the issuance of a data pulse.

As described above, a separated clock is issued periodically. This can be seen from the state diagram in FIG. 4. Step 64 corresponds to the issuance of a separated clock. Note that a step having an arrow which exits and re-enters the step, e.g. 72, 76, or 78, indicates that the particular step represents several repeated steps. For example, step 78 represents two steps in which a pulse is looked for and in which, if a pulse were received, the system would enter the delay sequence at arrow 2. Scanning down the state diagram, it will be noted that another separated clock will issue at step 82 or, again, at step 64 should a pulse be received during steps 78 or 80. If a pulse is received during step 78, the system will return to the separated clock step 64 through arrow 2.

It should be noted that the number of steps in the sequence between consecutive separated clock steps is approximately equal. Note also that the number of steps between the detection of a pulse, e.g., in step 60 or step 65 and the issuance of a separated data signal in step 63 is approximately the same. Thus, even while delay states are being inserted or deleted in the tracking of the incoming data stream, the separated clock signals are issued at a periodic rate which is independent of the tracking function of the data separator.

The short delay between the detection of a one's data pulse and the issuance of a separated data pulse permits the system to correct for any tracking errors or the like before issuing the data pulse.

In blocks 82A through 82D, the step-by-stey issuance of a separated clock is illustrated. In 82A, the system sets the separated clock output high. In block 82B, which is part of the same microstep, the system checks for the presence of any incoming data pulses. In blocks 82C and 82D, the system resets the separated clock output low to terminate the clock pulse. It can therefore be seen that a separated clock pulse in this embodiment of the invention has a pulse width one microstate wide.

In the issuance of a separated data bit, step 74, the output is set and reset in a similar manner. The primary difference between the two being that no pulse is looked for during the bit setting operation since step 74 is located in the delay block of the state diagram.

As discussed above, several repetitive blocks are shown in the state diagram of FIG. 4. Repetitive steps 72 and 76 permit the system delay to be varied before or after a separated data bit is issued. Likewise, repetitive steps 78, 80, 84, 86 and 88 permit the window width to be varied in the number of early subintervals inserted or the number of late subintervals inserted. The number of repetitions for each block is preferably selected according to the operating condition requirements of each system.

Referring to FIG. 5, the circuit of the preferred embodiment of the invention which implements the above system is illustrated. A multiplexer 90 receives the MFM encoded data at one of its inputs and the complement thereof at a second input. Other inputs to the multiplexer 90 are connected to ground and to a high level. Control signals are supplied to the multiplexer 90 from a read-only memory 92. Depending upon the signals supplied by the read-only memory 92, multiplexer 90 provides either a ground signal, a high signal, or the incoming data signal to the load input to a counter circuit 94. Counter circuit 94 is clocked by a 10 MHz clock, including a 20 MHz crystal oscillator 96 and a flipflop 98. Unless a load signal is provided by multiplexer 90 to counter 94, the counter will continue to increment its current count sequence. On the other hand, whenever a load signal is provided by multiplexer 90, counter 94 loads in the number present at its preset inputs and begins incrementing its count from that number.

The number presented to the counter preset inputs is provided by read-only memories 100. Read-only memories 100 are addressed by the count output from counter 94. As the count is incremented, the address to ROM 100 is also incremented, thereby changing the ROM 100 output. As such, a different number is presented to the inputs of counter 94 for each successive output of counter 94. However, only when a load signal is received from multiplexer 90 is the number presented to the counter 94 preset input actually loaded into the counter, and only then does the counter provide a count from that number.

The counter 94 output is also provided to address ROM 92. In addition to the control output to multiplexer 62, ROM 92 provides the separated data and separated clock signals to a latch 102.

In operation, ROM 100 provides the addresses or starting points of a number of sequences, any sequence of which will be executed by counter 94 if a load signal is received from multiplexer 90 when such starting point is presented to counter 94. ROM 92 interprets the current point in the sequence being stepped through by counter 94 and provides appropriate control signals to the multiplexer 90 and separated clock and data pulses to latch 102 for output to the user.

Each point in the sequence which is stepped through by counter 94 corresponds to a step in the state diagram of FIG. 4. The addresses provided by ROM 100 in response to a particular counter 92 output corresponds to the branching activity illustrated for the particular state diagram step. For example, in step 78, i.e., the step being executed by counter 94, the ROM 100 output indicates a branch to delay state 62 (arrow 2), if a pulse is received. In this sequence, ROM 92 interprets the counter 94 output as indicating that the time window in multiplexer 90 should be opened.

On the other hand, in step 70, ROM 92 interprets the counter 94 output as indicating a no-branch condition and tells multiplexer 90 to output a no-branch signal.

By implementing a data separator in the above manner, a wide variety of step sequences can be implemented to handle the various adjustments required for accurate data recovery. For example, exit from and entry into a sequence at a particular point can be different for each point or the same for several points. Delays can be easily inserted or deleted. The states of the previous pulses received can be kept track of simply by the particular state in which the system is currently in. For example, if the system were in step 78 of the state diagram, FIG. 4, the previously detected pulse corresponded to a one's data state. Conversely, if the system were in block 50 of the data window, the system would know that the next pulse would represent a one's data state and that a zero's data state precedes it, the zero's data state in turn being preceded by a one's data state.

The above implementation also permits easy adjustment of the time window of multiplexer 90. Adjustments can be made pursuant to each pulse received. Conversely, if a pulse is not received as expected interval adjustments can also be made.

Also included in FIG. 5 is a set of flipflops connected between the raw data input from the magnetic storage media and the multiplexer 90 input. The purpose of these flipflops 104, 105 and 106 is to shape and condition the incoming pluse waveforms. Three flipflops are used to avoid any instability which might occur should the incoming pulse arrive concurrently with the edge of the flipflop clock signal. The trailing edge of the incoming pulse sets flipflop 104. The pulse is then clocked into the flipflop 104. The pulse is then clocked into the flipflop 105 and in turn clocked into flipflop 106. At the point flipflop 106 makes the data pulse available to multiplexer 90, flipflops 104 and 105 are reset. This limits the input pulse to one microstate in width, regardless of raw data pulse width.

The invention as described above assumes initial synchronization of the data separator to the MFM data stream. In the preferred embodiment the data separator also has a synchronization mode which is entered into when the SYNC line in FIG. 5 is asserted. This line is asserted by, for example, the system controller whenever a synchronization pattern, discussed below, is present in the MFM data stream.

In the present invention the MFM data are typically formatted as follows: first, an address mark, followed by a known pattern of ones and/or zeros; next, a byte sync followed by the field of MFM data. The address mark is a set of characters which are illegal for data purposes. The known pattern following the address mark is used to synchronize the system to the incoming data. Typically, when the present invention is used in a data recovery system, an address mark detector will provide an indication to the system controller whenever an address mark is present in the MFM data stream. After an appropriate delay the controller will assert the sync line of the data separator to cause the data separator to synchronize to the synchronization pattern. At the end of this synchronizing pattern, the data separator is initialized to begin recovery of the data from the MFM stream. A synchronizing pattern of all ones or all zeros is normally chosen since such a pattern corresponds to a higher frequency of pulses and therefore a quicker synchronization. The byte sync which follows this known pattern has a state opposite that of the known pattern. The byte sync serves to designate the start of the data field as well as to define the point in the system flow diagram at which the decoding is to begin. For example, if the first pulse of the byte sync represented a zero's data state the decoding would commence at step 32 of the flow diagram in FIG. 3. If, on the other hand, the pulse represented a one's data state, the decoding would start at step 36. As implemented in FIG. 3, the data separator treats the first pulse as representing a zero's data state.

The arrangement of the present invention provides for a great flexibility in decoding MFM encoded information, while providing a sophisticated system at low cost. Additionally, because the few components that are used are all digital, verification that the components individually are sound are indicative that the system, when assembled, will perform satisfactorily.

The terms and expressions which have been employed here are used as terms of description and not of limitation, and there is no intention, in the use of such terms and expressions of excluding equivalents of the features shown and described, or portions thereof, it being recognized that various modifications are possible within the scope of the invention claimed.

What is claimed is:

1. A data separator for extracting encoded data from a frequency modulated pulse stream and for supplying a separated clock signal and a separated data signal in accordance with the extracted data, comprising
    clock means for generating a clock signal having a frequency which is significantly higher than the frequency of the pulse stream;
    window means responsive to the pulse stream and to a control signal, the window means supplying an output signal which is selected from among a number of signals, including the pulse stream, in accordance with the control signal;
    sequencing means responsive to the window means output signal and to the clock signal for executing a step sequence which is designated from among a number of predetermined step sequences, each sequence having a number of steps, the sequencing means executing each step of the designated sequence at the clock signal frequency, the designated sequence being selected by the sequencing means according to the step being executed at the moment of receipt of a predetermined signal from the window means output; and
    control means responsive to the steps being executed by the sequencing means for interpreting each step, for supplying the control signal to the window means, and for providing the separated clock signal and the separated data signal, all in accordance with the step being executed by the sequencing means.

2. A data separator for extracting encoded data from a pulse stream comprising
    a multiplexer responsive to the pulse stream and to a control signal for providing an output signal which is selected from among a number of signals, including the pulse stream, in accordance with the control signal;
    clock means having a frequency at least ten times higher than the pulse stream frequency;
    a counter responsive to the multiplexer output and to a jump address signal, the counter being presettable so that the jump address signal is loaded into the counter whenever the appropriate multiplexer output signal is presented to the counter;
    first memory means responsive to the counter output for supplying the jump address, the jump address being indicative of the state of the data within the pulse stream and the position of the pulse in pulse stream; and
    second memory means responsive to the counter output for interpreting the counter output to provide the corresponding separated data and clock outputs and appropriate control signals to the multiplexer.

3. The data separator, as recited in claim 1, wherein the window means is a multiplexer.

4. The data separator, as recited in claim 1, wherein the sequencing means include
    a presettable counter responsive to the clock signal and to a jump address signal which has a plurality of distinct states, the counter being preset with the then existing jump address signal state whenever a predetermined signal is received from the window means, the counter supplying an output which is incremented from the jump address, at the clock signal frequency, until a new jump address is preset into the counter; and
    memory means responsive to the counter output for supplying the jump address corresponding to the counter output.

5. The data separator, as recited in claim 1, wherein each step sequence comprises a number of timing states including a delay state, an early state, a late state, and a centered state, and further, wherein the coincidence of the appropriate window means output signal with a particular timing state causes an appropriate step sequence to be designated in the data separator which is interpreted by the control means to provide appropriate control means output and tracking responses, including issuance of a separated data signal, issuance of a separated clock signal, and issuance of a corrective tracking control signal to adjust the operation of the window means for drive variations and bit shift effects.

6. A method for extracting encoded data from a pulse stream from a magnetic recording medium in which rotational variations and bit shift effects in the magnetic recording medium cause the pulses within the pulse stream to be shifted from their expected positions comprising the steps of
    monitoring selected portions of the pulse stream;
    applying the selected pulse stream portions to a sequencing means;
    designating a first step sequence from a number of step sequences for execution by the sequencing means according to the step being executed by the sequencing means at the moment of receipt of a pulse in the selected pulse stream portion;

applying the steps as executed by the sequencing means to a first memory means so that a second step sequence is identified to the sequencing means for execution in the event that a pulse is present in the selected pulse stream portion;

interpreting the steps as executed by the sequencing means to determine the data state of any pulses received, to detect tracking and bit shift effects, and to provide separated data and separated clock output signals; and modifying the monitoring of the selected pulse stream portions in light of the tracking and bit shift errors to optimize accurate data extraction.

7. The data extraction method, as recited in claim 6, wherein the modification step includes the steps of estimating the trend of the tracking and bit shift effects; and shifting the position within the pulse stream at which the monitoring of the pulse stream is to begin, so that the probability is maximized that subsequent pulses will occur within the portions of the pulse stream selected to be monitored.

8. A method of extracting encoded data from a pulse stream, the pulse stream having a sequence of pulses the method comprising the steps of monitoring the pulse stream through a sequence of hypothetical one's data state and zero's data state windows, each window having a designated position and duration in relation to the other windows within the sequence;

classifying the data represented by any one pulse in the pulse stream according to the particular hypothetical window through which the pulse was monitored and the data state classification of previously received pulses;

ordering subsequent windows within the sequence of hypothetical window's according to the data state classification of the pulse being presently received;

determining the position of the received pulse within the window through which it is being monitored; and adjusting the position and duration of subsequent window's in the sequence of hypothetical windows in accordance with the pulse position information to maximize the probability that subsequent pulses in the data stream will be properly monitored and classified.

9. The method of extracting encoded data from a pulse stream as recited in claim 8, wherein the pulse position determination step includes the step of partitioning each hypothetical window into a plurality of subintervals;

designating the subintervals as "early", "centered" or "late" subintervals so that a pulse arriving at the beginning of the window is coincident with one of the early subintervals, a pulse arriving toward the end of the window is coincident with one of the late subintervals, and a pulse arriving in the middle of the window is coincident with the centered subinterval; and identifying the window subinterval with which a received pulse is coincident.

10. The data extraction method, as recited in claim 9, wherein the window adjustment step includes the step of inserting a number of delay time intervals between each data state window, the number of delay time intervals which are inserted between any two adjacent windows being a function of the window subinterval with which the last received pulse was coincident.

11. A data separator for extracting data from a frequency modulated pulse stream comprising means for generating a clock signal having a frequency which is greater than the pulse stream frequency;

first means responsive to the pulse stream for supplying an output signal which is selected, in accordance with a control signal, from among a number of signals, including the pulse stream;

second means responsive to the first means output and to the clock signal, for executing a sequence of steps at the clock signal frequency, wherein the second means select the sequence to be executed according to the first means output and the step currently being executed, the sequence steps providing extracted data and pulse stream tracking information; and control means responsive to the data and tracking information for supplying the separated data signal and the separated clock signal, and for providing the control signal so that the first means output is adjusted for optimal tracking of the pulse stream.

12. The data separator as recited in claim 11 wherein the second means comprise counting means for providing a binary number which is incremented, at the clock signal frequency, from a preset number which is supplied to the counting means at the time of receipt of a pulse from the first means; and first memory means, responsive to the binary number supplied by the counting means, for providing the preset number to the counting means, the present number which is provided at any instant including the contents of the memory means at the address location specified by the binary number.

13. The data separator as recited in claim 11 wherein the control means include second memory means responsive to the binary number supplied by the counting means, the contents of the second memory means, at the address specified by the binary number from the counting means, providing the control signal, the separated data signal, and the separated clock signal.

14. The data separator as recited in claim 11 further including pulse conditioning and shaping means for receiving the pulse stream and for supplying a conditioned pulse stream to the first means.

15. The data separator as recited in claim 14 wherein the pulse conditioning and shaping means comprise first latch means, responsive to the pulse stream, for providing a ones state output whenever a pulse is present in the pulse stream;

second latch means, responsive to the first latch means output and to the clock signal, for providing an output which corresponds to the first latch means output in accordance with the clock signal; and third latch means, responsive to the second latch means output and to the clock signal, for providing an output which corresponds to the second latch means output in accordance with the clock signal, the third latch means also resetting the first and second latch means whenever the output of the third latch means is as one's state, so that any instability due to the coincidence of the received pulse with a clock signal transition is avoided.

* * * * *